US011652623B2

(12) United States Patent
Jiang et al.

(10) Patent No.: US 11,652,623 B2
(45) Date of Patent: May 16, 2023

(54) SECURE CONFERENCE SYSTEM

(71) Applicant: International Business Machines Corporation, Armonk, NY (US)

(72) Inventors: Ming Zhe Jiang, BeiJing (CN); Yi Yuan, Beijing (CN); Xiao Hu He, Beijing (CN); Xiao Yan Wang, Beijing (CN); Xiao Tong Chi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 17/361,413

(22) Filed: Jun. 29, 2021

(65) Prior Publication Data

US 2022/0417006 A1 Dec. 29, 2022

(51) Int. Cl.
*H04L 9/08* (2006.01)
*H04L 12/18* (2006.01)
(Continued)

(52) U.S. Cl.
CPC .............. *H04L 9/088* (2013.01); *H04L 9/065* (2013.01); *H04L 9/50* (2022.05); *H04L 12/18* (2013.01); *H04L 12/4641* (2013.01)

(58) Field of Classification Search
CPC . H04L 9/088; H04L 12/18; H04L 9/50; H04L 63/061; H04L 9/065; H04L 51/10;
(Continued)

(56) References Cited

U.S. PATENT DOCUMENTS 10,146,947 B1 * 12/2018 Chapman .............. H04L 9/3231
2017/0134937 A1 * 5/2017 Miller ................. G06Q 20/3829
(Continued)

FOREIGN PATENT DOCUMENTS

CN 113132315 A * 7/2021 ......... H04L 63/0442
CN 114598562 A * 6/2022
(Continued)

OTHER PUBLICATIONS

Tan et al., "Achieve Fully Decentralized End to End Encryption Meeting via Blockchain." Technology department Huolala Shenzhen, China, Dec. 17, 2020. 6 Pages.

*Primary Examiner* — Glenton B Burgess
*Assistant Examiner* — Rachel J Hackenberg
(74) *Attorney, Agent, or Firm* — Cantor Colburn LLP; Edward Wixted

(57) ABSTRACT

Methods, systems, and computer program products for operating a secure conference system. A non-limiting example of the computer-implemented method includes transmitting an invitation for a conference to a plurality of participants and instructing a blockchain system to create a blockchain network at a start of the conference. The blockchain network includes a node corresponding to each of the plurality of participants and a node corresponding to a central conference device. The method also includes obtaining, from the node of the blockchain network corresponding to the central conference device, a secret key corresponding to the central conference device and receiving an media communication stream from each of the plurality of participants. The method further includes creating a mixed media communication stream by combining the media communication stream from each of the plurality of participants, encrypting, using the secret key, the mixed media communication stream and multicasting the mixed media communication stream to the plurality of participants.

17 Claims, 6 Drawing Sheets

(51) Int. Cl.
*H04L 9/00* (2022.01)
*H04L 9/06* (2006.01)
*H04L 12/46* (2006.01)

(58) Field of Classification Search
CPC ......... H04L 9/085; H04L 9/14; H04L 9/0643; H04L 67/10; H04L 63/0478; H04L 63/105; H04L 12/4641; H04L 65/403; H04L 65/611
See application file for complete search history.

(56) References Cited

U.S. PATENT DOCUMENTS

2020/0119936 A1     4/2020   Balasaygun et al.
2020/0351095 A1*   11/2020   Yadav ............... G06Q 20/40145

FOREIGN PATENT DOCUMENTS

| EP | 3822894 A1 * | 5/2021 | ........... G06Q 10/107 |
| EP | 3835990 A1 * | 6/2021 | ........... G06F 16/953 |
| KR | 20190033800 A | 4/2019 | |

* cited by examiner

SECURE CONFERENCE SYSTEM

BACKGROUND

The present invention generally relates to conference systems, and more specifically, to providing and operating secure conference systems.

Current telecommunication systems support teleconferencing (live telephone exchange) by providing services such as audio, video, and data to participants during a live telephone call. Meanwhile, Internet teleconferencing (live web exchange) includes internet telephone, videoconferencing, web conferencing, and even augmented reality conferencing, and provides participants with the same services via the Internet. During a teleconference, participants are linked together by a telecommunication system and are able to perform a live exchange of spoken conversation and data sharing. Participants are often communicating with one another through telephones, computers, headsets, mobile devices, appliances (televisions), and the like.

In Internet-based conference systems, a central device creates a mixed media communication stream from streams received from active participants. The central device multicasts the mixed media communication stream to all the conferencing participant endpoints. Such Internet-based conference systems are not secure and have various security drawbacks. For example, the mixed media communication stream can be eavesdropped in the middle of the routine path, or the mixed media communication stream could be eavesdropped by a malicious attacker who joins in the conference as an endpoint.

SUMMARY

Embodiments of the present invention are directed to a computer-implemented method for operating a secure conference system. A non-limiting example of the computer-implemented method includes transmitting an invitation for a conference to a plurality of participants and instructing a blockchain system to create a blockchain network at a start of the conference. The blockchain network includes a node corresponding to each of the plurality of participants and a node corresponding to a central conference device. The method also includes obtaining, from the node of the blockchain network corresponding to the central conference device, a secret key corresponding to the central conference device and receiving an media communication stream from each of the plurality of participants. The method further includes creating a mixed media communication stream by combining the media communication stream from each of the plurality of participants, encrypting, using the secret key, the mixed media communication stream and multicasting the mixed media communication stream to the plurality of participants. The method provides a secure Internet-based conference system which encrypts communications between participant device and a central conference device.

In some embodiments, each of the plurality of participants encrypt communications sent to the central conference device and the method further includes decrypting each of the media communication stream from each of the plurality of participants. In these embodiments, the transmission of both the media communication stream of each of the plurality of participants and the mixed media communication stream are encrypted for added security.

In one embodiment, access to the blockchain network is limited to the plurality of participants and the central conference device. By limiting access to the blockchain network to only the plurality of participants and the central conference device, access to the secret keys needed to decrypt the media communication streams is restricted.

Embodiments of the present invention are directed to a secure conference system having a processor communicatively coupled to a memory. The processor is configured to transmit an invitation for a conference to the plurality of participants and instruct the blockchain system to create a blockchain network at a start of the conference. The blockchain network includes a node corresponding to each of the plurality of participants and a node corresponding to a central conference device. The processor is also configured to obtain, from the node of the blockchain network corresponding to the central conference device, a secret key corresponding to the central conference device and to receive a media communication stream from each of the plurality of participants. The processor is further configured to create a mixed media communication stream by combining the media communication stream from each of the plurality of participants, encrypt, using the secret key, the mixed media communication stream, and multicast the mixed media communication stream to the plurality of participants.

In some embodiments, each of the plurality of participants encrypt communications sent to the central conference device and the processor is further configured to decrypt each of the media communication stream from each of the plurality of participants. In these embodiments, the transmission of both the media communication stream of each of the plurality of participants and the mixed media communication stream are encrypted for added security.

In one embodiment, access to the blockchain network is limited to the plurality of participants and the central conference device. By limiting access to the blockchain network to only the plurality of participants and the central conference device, access to the secret keys needed to decrypt the media communication streams is restricted.

Embodiments of the invention are directed to a computer program product for operating a secure conference system, the computer program product comprising a computer readable storage medium having program instructions embodied therewith. The program instructions are executable by a processor to cause the processor to perform a method. A non-limiting example of the method includes transmitting an invitation for a conference to a plurality of participants and instructing a blockchain system to create a blockchain network at a start of the conference. The blockchain network includes a node corresponding to each of the plurality of participants and a node corresponding to a central conference device. The method also includes obtaining, from the node of the blockchain network corresponding to the central conference device, a secret key corresponding to the central conference device and receiving an media communication stream from each of the plurality of participants. The method further includes creating a mixed media communication stream by combining the media communication stream from each of the plurality of participants, encrypting, using the secret key, the mixed media communication stream and multicasting the mixed media communication stream to the plurality of participants. The computer program product provides a secure Internet-based conference system which encrypts communications between participant device and a central conference device.

In some embodiments, each of the plurality of participants encrypt communications sent to the central conference device and the method further includes decrypting each of the media communication stream from each of the plurality of participants. In these embodiments, the transmission of both the media communication stream of each of the plurality of participants and the mixed media communication stream are encrypted for added security.

In one embodiment, access to the blockchain network is limited to the plurality of participants and the central conference device. By limiting access to the blockchain network to only the plurality of participants and the central conference device, access to the secret keys needed to decrypt the media communication streams is restricted.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
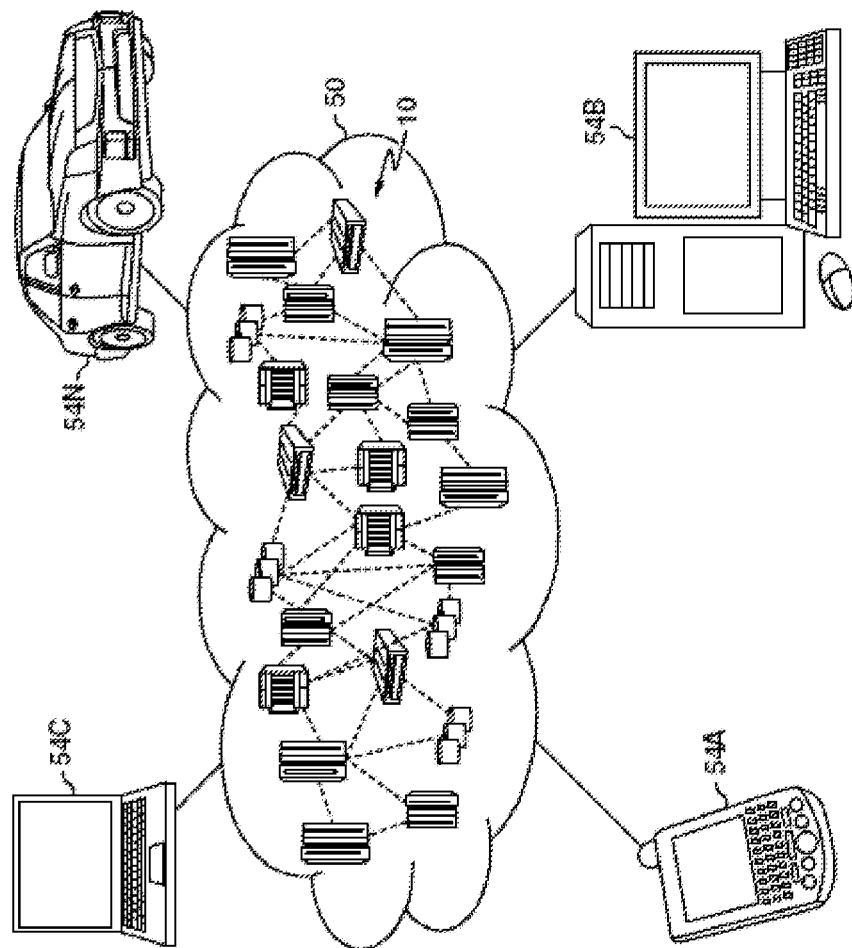
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, traditional Internet-based conference systems are not secure. Exemplary embodiments provide methods, systems and computer program products for providing and operating a secure Internet-based conference system. In one embodiment, a secure Internet-based conference system is configured to encrypt communications between participant device and a central conference device and to utilize a blockchain network to manage creation and distribution of the keys used for the encryption and decryption. In one embodiment, the blockchain network is configured to ensure that secret key can be negotiated in a decentralized way, and the secret key can be distributed safely in all authorized participants through blockchain network, which malicious attacker can not to join.

In exemplary embodiments, a central conference device, using the negotiated secret key, encrypts the media communication stream before multicasting the stream to the participants. After receiving the encrypted media communication stream each participant device will decrypt the media communication stream. Since malicious users have no way acquiring the negotiated secret in blockchain system, even if a malicious user captures the encrypted audio stream, the malicious users will be unable to decrypt the media communication stream. In one embodiment, each participant device is also configured to encrypt a voice stream sent from the participant device to the central conference device.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
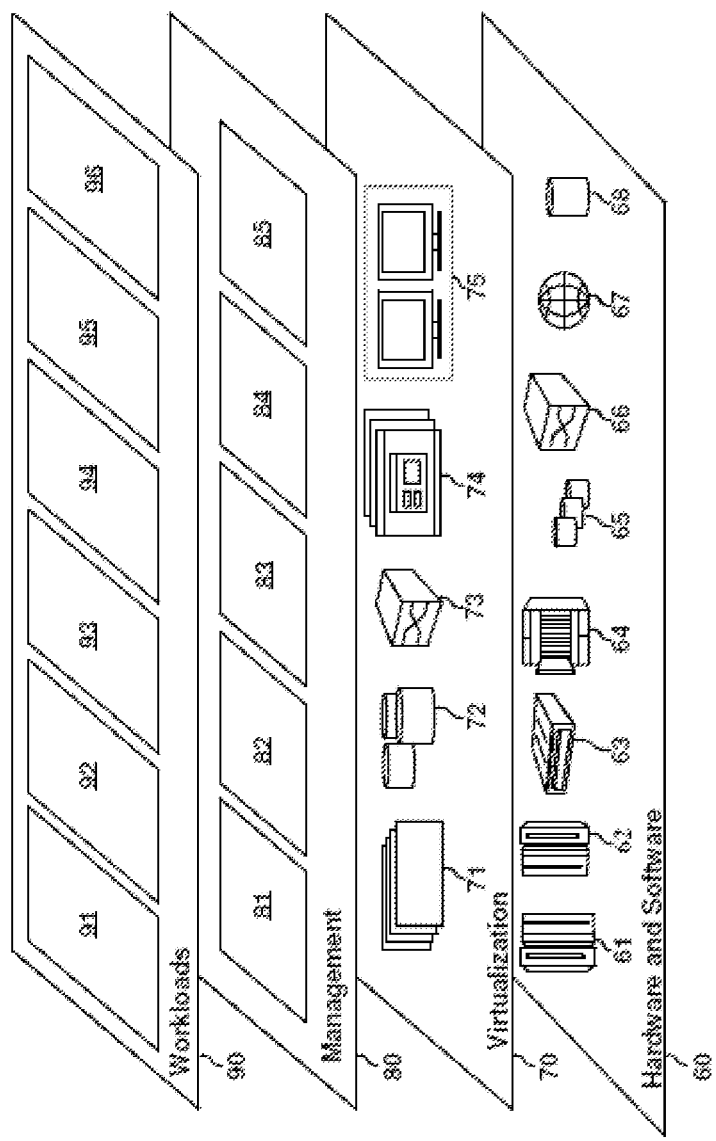
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure conference systems 96.

Figure 3:
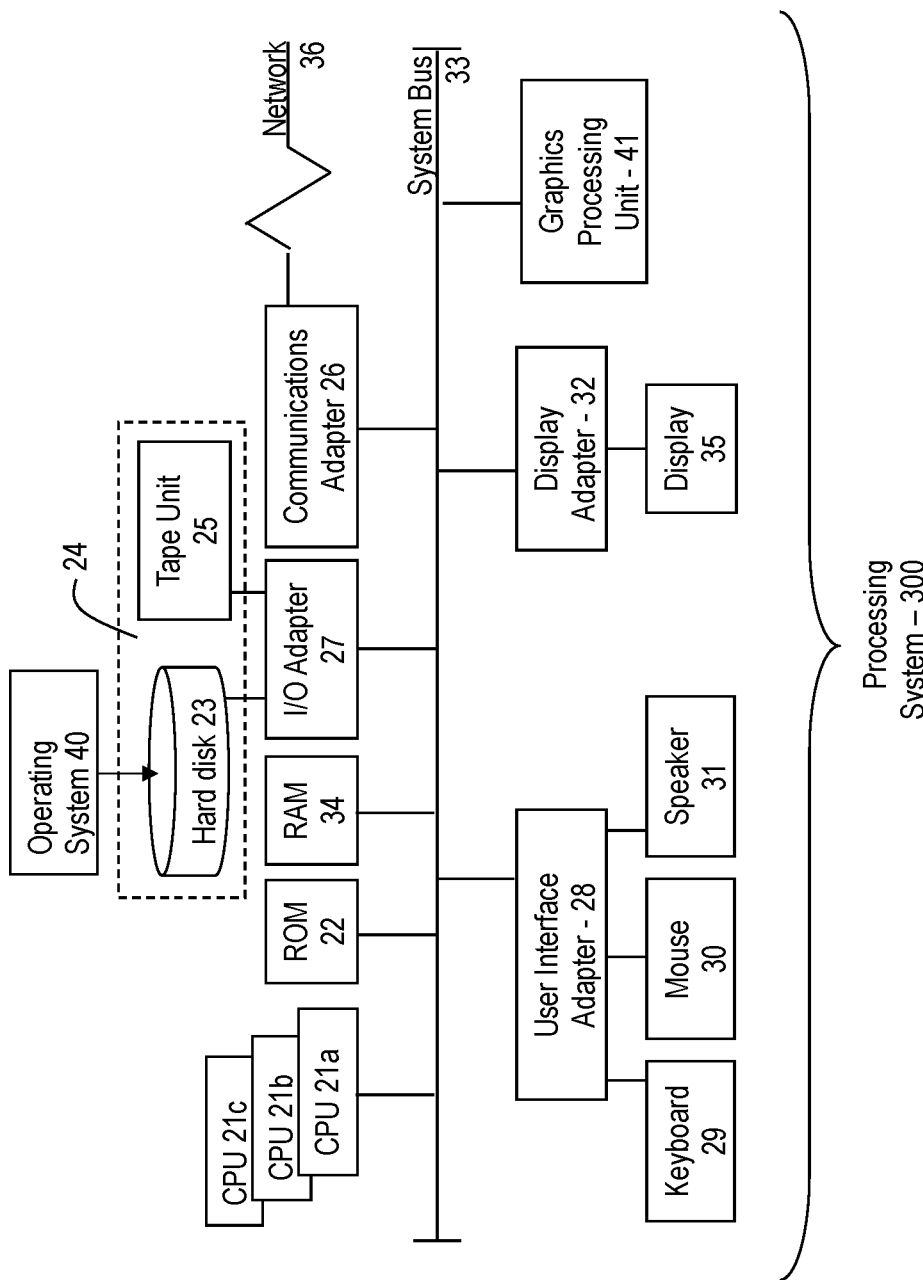
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage device 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of the aspects of the invention, one or more embodiments of the invention address the above-described shortcomings of the prior art by providing systems and methods for secure conferencing. In one embodiment, a secure conferencing system is provided that includes a central conferencing device, a plurality of participant devices and a blockchain system. The secure Internet-based conference system is configured to encrypt communications between participant device and a central conference device and to utilize the blockchain system to manage creation and distribution of the keys used for the encryption and decryption.

In exemplary embodiments, the central conferencing device is configured to receive an media communication stream from each of the plurality of participant devices and to create a mixed media communication stream that is multicast to all of the participant devices. In one embodiment, the central conferencing device is configured to encrypt the mixed media communication stream before multicasting the mixed media communication stream to the participants. Likewise, in some embodiments, each participant device is configured to encrypt its media communication stream prior to transmitting it to the central conferencing device. After receiving the encrypted mixed media communication stream each participant device will decrypt the mixed media communication stream before presenting the mixed media communication stream before to a user.

In general, a blockchain is a growing list of records, called blocks, which are linked using cryptography. Each block in a blockchain contains a cryptographic hash of the previous block, a timestamp, and transaction data. By design, a blockchain is resistant to modification of the data. It is a distributed ledger that can record transactions between two or more parties efficiently and in a verifiable and permanent way. For use as a distributed ledger, blockchain is typically managed by a peer-to-peer network (referred to herein as a blockchain network) collectively adhering to a protocol for inter-node communication and validating new blocks. Once recorded, the data in any given block cannot be altered retroactively without alteration of all subsequent blocks, which requires consensus of the network majority.

Figure 4:
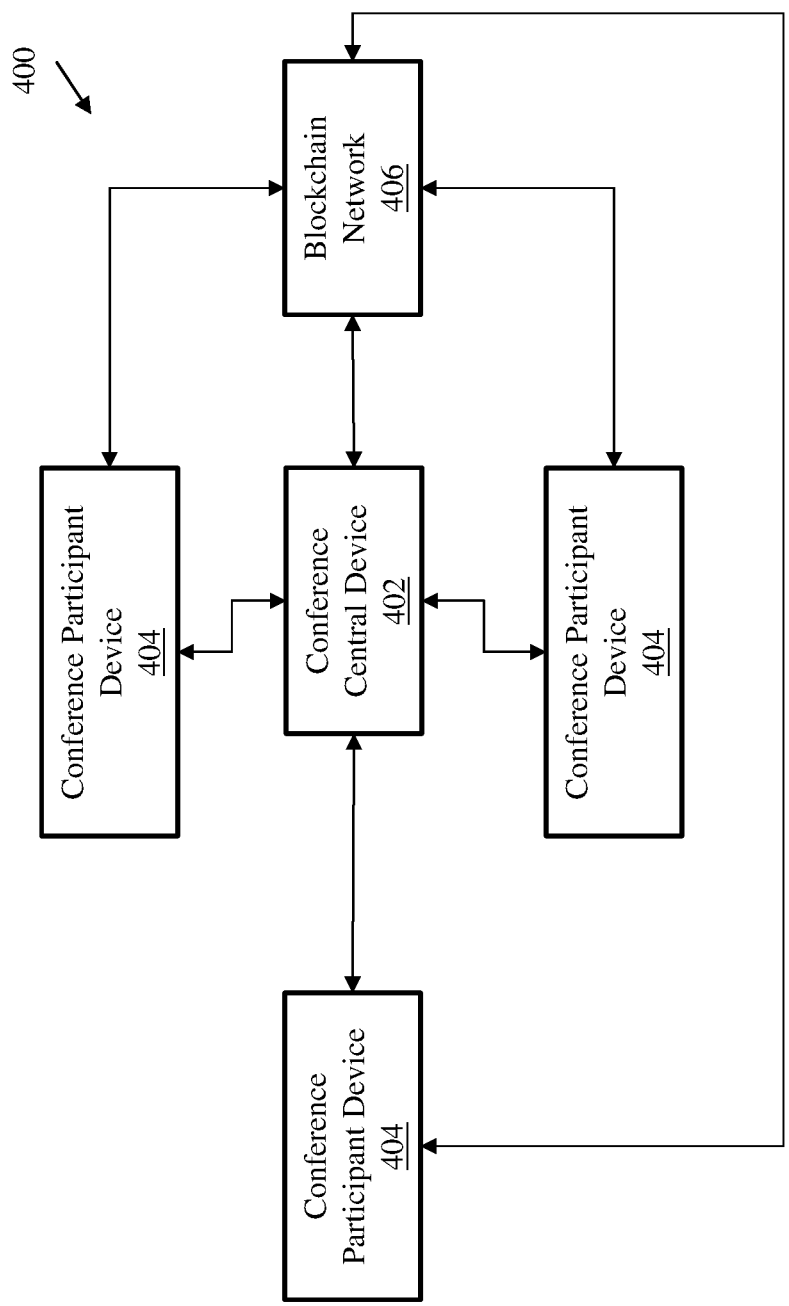
FIG. 4 depicts a block diagram of a secure conferencing system according to one or more embodiments of the invention.

Turning now to a more detailed description of aspects of the present invention, FIG. 4 depicts a block diagram of a secure conferencing system 400 according to one or more embodiments of the invention. The secure conferencing system 400 includes a central conference device 402, a plurality of conference participant devices 404 and a blockchain network 406. In one embodiment, the central conferencing device 402 is embodied as a processing system, such as the one shown in FIG. 3, or in a cloud-based environment, such as the one shown in FIGS. 1 and 2. In one embodiment, the conference participant devices 404 may be embodied a processing system, such as the one shown in FIG. 3, a smartphone, a tablet, or any other suitable device. The blockchain network 406 may be embodied as a processing system, such as the one shown in FIG. 3, or in a cloud-based environment, such as the one shown in FIGS. 1 and 2. Each of the conference participant devices 404 are configured to transmit an media communication stream to the central conference device 402. The central conference device 402 is configured to create a mixed media communication stream from the received media communication streams and to encrypt the mixed media communication stream. Once the mixed media communication stream is created and encrypted, the central conference device 402 is configured to multicast the mixed media communication stream to all of the conference participant devices 404. In exemplary embodiments, each conference participant device 404 is configured to encrypt its media communication stream before it is transmitted to the central conference device 402.

In exemplary embodiments, the blockchain network 406 is configured to manage creation and distribution of the keys used by the central conference device 402 and the conference participant devices 404 for encryption and decryption of media communication streams. In one embodiment, the blockchain network 406 is configured to ensure that secret keys can be negotiated in a decentralized way, and the secret keys can be distributed safely to all authorized participants.

Figure 5:
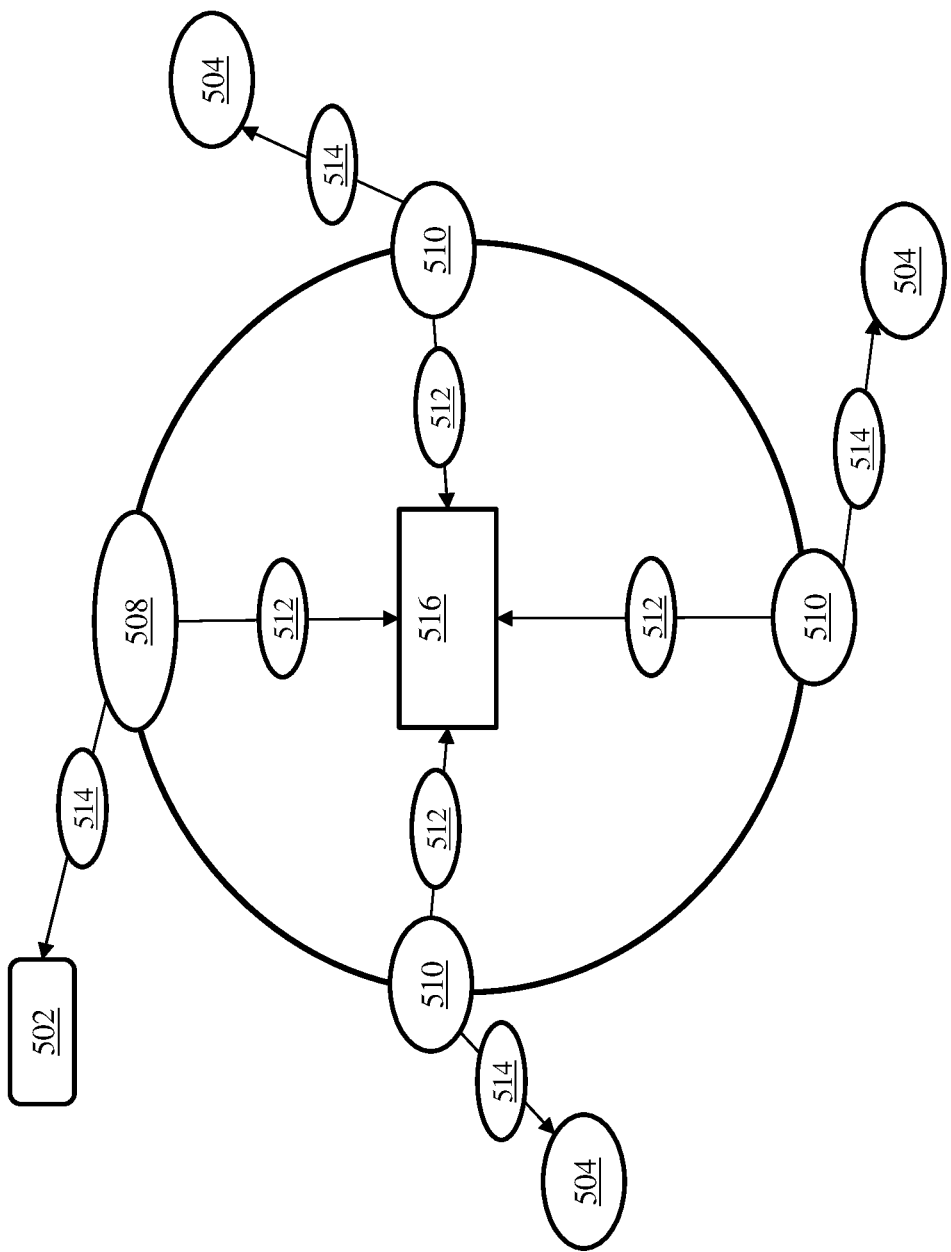
FIG. 5 depicts a schematic diagram of a blockchain network according to one or more embodiments of the invention.

Referring now to FIG. 5, a schematic diagram of a blockchain network is shown. The blockchain network is created based upon a meeting invitation and is created at the start of a meeting. The blockchain network 506 includes a plurality of nodes 510 that each correspond to a conference participant 504 and a node 508 that corresponds to a central conference device 502. In exemplary embodiments, a chaincode that is used be each node 508, 510 for key generation is deployed on each node, via smart contracts 512. The nodes 508, 510 create secret keys 514 that are provide to the nodes 508, 510. In one embodiment, each node 508, 510 is configured to store a hash code of the secret key into block 516, which is a storage device accessible by each of the nodes 508, 510. In exemplary embodiments, each conference participant 504 is configured to obtain a unique secret key 514 for its corresponding node 510 in the blockchain network. The unique secret key 514 is used by each conference participant 504 to encrypt its media communication stream before it is transmitted to the central conference device 502 and to decrypt the mixed media communication stream received form the central conference device 508.

Figure 6:
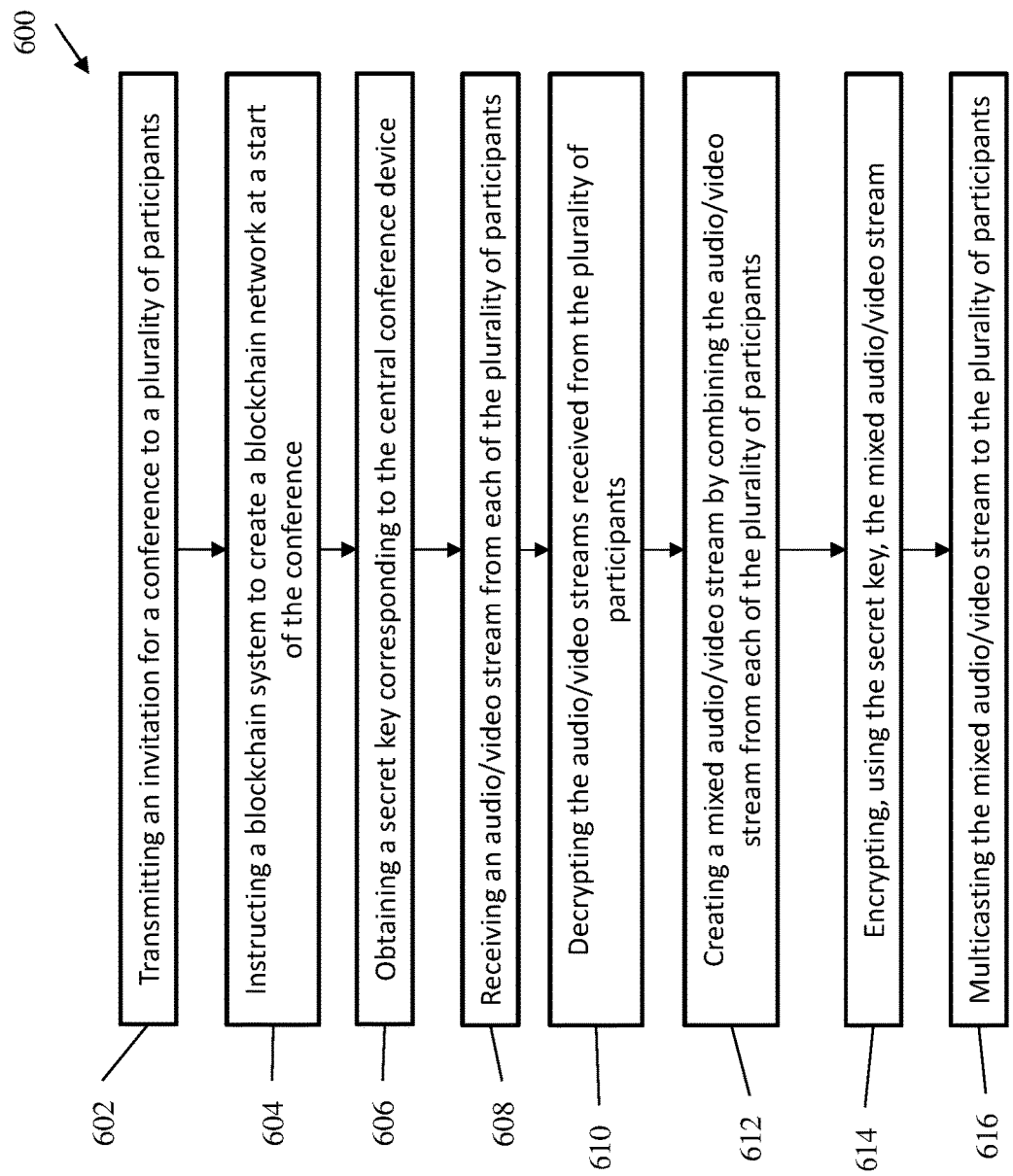
FIG. 6 depicts a flow diagram of a method for operating a secure conferencing system according to one or more embodiments of the invention.

Referring now to FIG. 6, a flow diagram of a method for operating a secure conferencing system according to one or more embodiments of the invention is shown. The method 600 includes transmitting an invitation for a conference to a plurality of participants, as shown at block 602. In exemplary embodiments, the invitation includes a start time of the conference, an indication of the identity of each of the plurality of participants, a duration of the conference, a means of accessing the conference, a passcode for the conference, and the like. In one embodiment, a central conference device creates the invitation in response to a request from one of the plurality of participants. Next, as shown at block 604, the method 600 includes instructing a blockchain system, by the central conference device, to create a blockchain network at a start of the conference. The blockchain network includes a node corresponding to each of the plurality of participants and a node corresponding to a central conference device. In exemplary embodiments, each node of the blockchain network includes a chaincode for key generation.

The method 600 also includes obtaining, from the node of the blockchain network corresponding to the central conference device, a secret key corresponding to the central conference device, as shown at block 606. Next, as shown at block 608, the method includes receiving, by the central conference device, an media communication stream from each of the plurality of participants. In one embodiment, the media communication streams received from the plurality of participants, are encrypted and the method 600 includes decrypting each of the media communication stream from each of the plurality of participants. After the media communication streams have been received from the plurality of participants, and decrypted, as shown at block 610, the method 600 includes creating a mixed media communication stream by combining the media communication stream from each of the plurality of participants, as shown at block 612. Next, as shown at block 614, the method 600 includes encrypting, using the secret key, the mixed media communication stream. In one embodiment, encrypting the mixed media communication stream includes splitting the mixed media communication stream into audio segments and encrypting each segment using the secret key. The method 600 concludes by multicasting the mixed media communication stream to the plurality of participants, as shown at block 616.

In exemplary embodiments, access to the blockchain network is limited to the plurality of participants and the central conference device. In one embodiment, access is secured using dual-factor authentication. In another embodiment, upon attempting to join a conference, each participant may be sent a unique code to a phone number or email address that the meeting invitation was sent to. That unique code along with a meeting passcode that was provided in the meeting invitation are required to access the blockchain network. In exemplary embodiments, each node of the blockchain network is configured to provide each participant and the central conference device with a unique secret key that is used to encrypt the media communication stream provided to the central conference device and to decrypt the mixed media communication stream received from the central conference device.

Additional processes may also be included. It should be understood that the processes depicted in FIG. 6 represent illustrations, and that other processes may be added or existing processes may be removed, modified, or rearranged without departing from the scope and spirit of the present disclosure.

In exemplary embodiments, the secret key is generated based on a smart contract by each node in the blockchain network. In one embodiment, each node uses the same smart contract and will generate keys using seed values, such as a time value. As a result, when the video/audio streams are split to several segments for transmission, the secret keys used for encryption are different for each segment.

Technical benefits include providing a secure Internet-based teleconferencing system which utilizes a blockchain network to control access to secret keys used in the encryption and decryption of media communication streams that are transmitted between participant devices and a central conference device. The secure Internet-based teleconferencing system prevents unauthorized access to the media communication streams that are created by the participant devices and unauthorized access to a mixed media communication stream created by a central conference device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for operating a secure conference system, the method comprising:

transmitting an invitation for a conference to a plurality of participants, wherein the invitation includes a meeting passcode;
instructing a blockchain system to create a blockchain network at a start of the conference, wherein the blockchain network includes a node corresponding to each of the plurality of participants and a node corresponding to a central conference device;
transmitting to each of the plurality of participants a unique code in response to a request to join the conference;
obtaining, from the node of the blockchain network corresponding to the central conference device, a secret key corresponding to the central conference device;
receiving a media communication stream from each of the plurality of participants;
creating a mixed media communication stream by combining the media communication stream from each of the plurality of participants;
encrypting, using the secret key, the mixed media communication stream; and
multicasting the mixed media communication stream to the plurality of participants,
wherein access to the blockchain network is limited to the plurality of participants and the central conference device and requires providing both the meeting passcode and the unique code.

2. The computer-implemented method of claim 1, further comprising decrypting each of the media communication stream from each of the plurality of participants.

3. The computer-implemented method of claim 1, wherein encrypting the mixed media communication stream includes splitting the mixed media communication stream into audio segments and encrypting each segment using the secret key.

4. The computer-implemented method of claim 1, wherein each node of the blockchain network includes a chaincode for key generation.

5. The computer-implemented method of claim 4, wherein each of the plurality of participants obtain a unique secret key from their corresponding node in the blockchain network.

6. The computer-implemented method of claim 5, wherein the unique secret keys are used to encrypt the media communication stream provided to the central conference device and to decrypt the mixed media communication stream received from the central conference device.

7. A secure conference system having a processor communicatively coupled to a memory, the processor configured to:
transmit an invitation for a conference to the plurality of participants, wherein the invitation includes a meeting passcode;
create a blockchain network at a start of the conference, wherein the blockchain network includes a node corresponding to each of the plurality of participants and a node corresponding to a central conference device;
transmit to each of the plurality of participants a unique code in response to a request to join the conference;
obtain, from the node of the blockchain network corresponding to the central conference device, a secret key corresponding to the central conference device;
receive an media communication stream from each of the plurality of participants;
create a mixed media communication stream by combining the media communication stream from each of the plurality of participants;
encrypt, using the secret key, the mixed media communication stream; and
multicast the mixed media communication stream to the plurality of participants,
wherein access to the blockchain network is limited to the plurality of participants and the central conference device and requires providing both the meeting passcode and the unique code.

8. The secure conference system of claim 7, wherein the processor is further configured to decrypt each of the media communication stream from each of the plurality of participants.

9. The secure conference system of claim 7, wherein encrypting the mixed media communication stream includes splitting the mixed media communication stream into audio segments and encrypting each segment using the secret key.

10. The secure conference system of claim 7, wherein each node of the blockchain network includes a chaincode for key generation.

11. The secure conference system of claim 10, wherein each of the plurality of participants obtain a unique secret key from their corresponding node in the blockchain network.

12. The secure conference system of claim 11, wherein the unique secret keys are used to encrypt the media communication stream provided to the central conference device and to decrypt the mixed media communication stream received from the central conference device.

13. A computer program product comprising a computer readable storage medium having program instructions embodied therewith, the program instructions executable by a processor to cause the processor to perform a method comprising:
transmitting an invitation for a conference to a plurality of participants, wherein the invitation includes a meeting passcode;
instructing a blockchain system to create a blockchain network at a start of the conference, wherein the blockchain network includes a node corresponding to each of the plurality of participants and a node corresponding to a central conference device;
transmitting to each of the plurality of participants a unique code in response to a request to join the conference;
obtaining, from the node of the blockchain network corresponding to the central conference device, a secret key corresponding to the central conference device;
receiving an media communication stream from each of the plurality of participants;
creating a mixed media communication stream by combining the media communication stream from each of the plurality of participants;
encrypting, using the secret key, the mixed media communication stream; and
multicasting the mixed media communication stream to the plurality of participants,
wherein access to the blockchain network is limited to the plurality of participants and the central conference device and requires providing both the meeting passcode and the unique code.

14. The computer program product of claim 13, further comprising decrypting each of the media communication stream from each of the plurality of participants.

15. The computer program product of claim 13, wherein encrypting the mixed media communication stream includes splitting the mixed media communication stream into audio segments and encrypting each segment using the secret key.

16. The computer program product of claim 13, wherein each node of the blockchain network includes a chaincode for key generation.

17. The computer program product of claim 16, wherein each of the plurality of participants obtain a unique secret key from their corresponding node in the blockchain network.

* * * * *